United States Patent
Yao et al.

(10) Patent No.: US 12,524,903 B2
(45) Date of Patent: Jan. 13, 2026

(54) INCREMENTAL 2D-TO-3D POSE LIFTING FOR FAST AND ACCURATE HUMAN POSE ESTIMATION

(71) Applicant: Intel Corporation, Santa Clara, CA (US)

(72) Inventors: Anbang Yao, Beijing (CN); Yangyuxuan Kang, Beijing (CN); Shandong Wang, Beijing (CN); Ming Lu, Beijing (CN); Yurong Chen, Beijing (CN); Wenjian Shao, Shanghai (CN); Yikai Wang, Beijing (CN); Haojun Xu, Beijing (CN); Chao Yu, Beijing (CN); Chong Wong, Beijing (CN)

(73) Assignee: Intel Corporation, Santa Clara, CA (US)

( * ) Notice: Subject to any disclaimer, the term of this patent is extended or adjusted under 35 U.S.C. 154(b) by 350 days.

(21) Appl. No.: 18/031,564

(22) PCT Filed: Dec. 1, 2020

(86) PCT No.: PCT/CN2020/133084
§ 371 (c)(1),
(2) Date: Apr. 12, 2023

(87) PCT Pub. No.: WO2022/115991
PCT Pub. Date: Jun. 9, 2022

(65) Prior Publication Data
US 2023/0386072 A1   Nov. 30, 2023

(51) Int. Cl.
*G06T 7/73*   (2017.01)
*G06V 10/82*  (2022.01)
*G06V 40/10*  (2022.01)

(52) U.S. Cl.
CPC ............. *G06T 7/73* (2017.01); *G06V 40/103* (2022.01); *G06T 2207/20084* (2013.01); *G06T 2207/30196* (2013.01); *G06V 10/82* (2022.01)

(58) Field of Classification Search
None
See application file for complete search history.

(56) References Cited

U.S. PATENT DOCUMENTS

| 10,796,482 B2 * | 10/2020 | Ge ......................... G06N 3/0895 |
| 2020/0126297 A1 * | 4/2020 | Tian ........................ G06T 7/0012 |

(Continued)

FOREIGN PATENT DOCUMENTS

| CN | 109087329 A | 12/2018 |
| CN | 109948505 A | 6/2019 |

(Continued)

OTHER PUBLICATIONS

Wang, Keze, et al. "3D human pose machines with self-supervised learning." IEEE transactions on pattern analysis and machine intelligence 42.5 (2019): 1069-1082. (Year: 2019).*

(Continued)

*Primary Examiner* — Michelle M Entezari Hausmann
(74) *Attorney, Agent, or Firm* — Hanley, Flight & Zimmerman, LLC

(57) ABSTRACT

Techniques related to 3D pose estimation from a 2D input image are discussed. Such techniques include incrementally adjusting an initial 3D pose generated by applying a lifting network to a detected 2D pose in the 2D input image by projecting each current 3D pose estimate to a 2D pose projection, applying a residual regressor to features based on the 2D pose projection and the detected 2D pose, and combining a 3D pose increment from the residual regressor to the current 3D pose estimate.

21 Claims, 9 Drawing Sheets

(56) References Cited

U.S. PATENT DOCUMENTS

2020/0342270 A1    10/2020   Biswas et al.
2021/0252698 A1*   8/2021    Paxton .................. G05D 1/0246

FOREIGN PATENT DOCUMENTS

| CN | 111062326 A | 4/2020 |
| CN | 111311729 A | 6/2020 |
| CN | 111881773 A | 11/2020 |

OTHER PUBLICATIONS

Li L, Fang Y, Wu J, Wang J, Ge Y. Encoder-decoder full residual deep networks for robust regression and spatiotemporal estimation. IEEE transactions on neural networks and learning systems. Sep. 3, 2020;32(9):4217-30. (Year: 2020).*

Biswas S, Sinha S, Gupta K, Bhowmick B. Lifting 2d human pose to 3d: A weakly supervised approach. In2019 International Joint Conference on Neural Networks (IJCNN) Jul. 14, 2019 (pp. 1-9). IEEE. (Year: 2019).*

Habibie, Ikhsanul, et al. "In the wild human pose estimation using explicit 2d features and intermediate 3d representations." Proceedings of the IEEE/CVF conference on computer vision and pattern recognition. 2019. (Year: 2019).*

Sattler, Torsten, et al. "Understanding the limitations of cnn-based absolute camera pose regression." Proceedings of the IEEE/CVF conference on computer vision and pattern recognition. 2019. (Year: 2019).*

Okada, Ryuzo, and Stefano Soatto. "Relevant feature selection for human pose estimation and localization in cluttered images." European Conference on Computer Vision. Berlin, Heidelberg: Springer Berlin Heidelberg, 2008. (Year: 2008).*

Martínez-González, Angel, et al. "Residual pose: A decoupled approach for depth-based 3D human pose estimation." 2020 IEEE/RSJ International Conference on Intelligent Robots and Systems (IROS). IEEE, 2020. (Year: 2020).*

Agarwal, Ankur, and Bill Triggs. "3D human pose from silhouettes by relevance vector regression." Proceedings of the 2004 IEEE Computer Society Conference on Computer Vision and Pattern Recognition, 2004. CVPR 2004 . . . vol. 2. IEEE, 2004. (Year: 2004).*

National Search Report and Written Opinion for Dutch Patent Application No. 2029549, dated Feb. 28, 2023.

Yangyuxuan, K., et al., "Explicit Residual Descent for 3D Human Pose Estimation from 2D Joint Locations", Proceedings of the British Machine Vision Conference BMVC 2020, Sep. 7, 2020.

Ci, H., et al.,, Optimizing Network Structure for 3D Human Pose Estimation, IEEE/CVF International Conference on Computer Vision (ICCV); 2019.

International Search Report and Written Opinion for PCT Application No. PCT/CN2020/133084, dated Aug. 23, 2021.

Ionescu, C., et al., Human3.6M: Large Scale Datasets and Predictive Methods for 3D Human Sensing in Natural Environments, IEEE Transactions on Pattern Analysis and Machine Intelligence, 2014.

Martinez, J., et al., A simple yet effective baseline for 3d human pose estimation, Computer Vision and Pattern Recognition (CVPR); arXiv:1705.03098 [cs.CV]; Aug. 4, 2017.

Pavllo, D., et al., 3D human pose estimation in video with temporal convolutions and semi-supervised training, Computer Vision and Pattern Recognition (CVPR); arXiv:1811.11742 [cs.CV]; Mar. 29, 2019.

Yeh, R.A., et al., Chirality Nets for Human Pose Regression, 33rd Conference on Neural Information Processing Systems (NeurIPS 2019), arXiv:1911.00029v1 [cs.CV], Oct. 31, 2019.

Zhao, L., et al., Semantic Graph Convolutional Networks for 3D Human Pose Regression, Computer Vision and Pattern Recognition (CVPR), arXiv:1904.03345 [cs.CV], Mar. 8, 2020.

International Preliminary Report on Patentability from PCT/CN2020/133084 notified Jun. 15, 2023, 6 pgs.

* cited by examiner

INCREMENTAL 2D-TO-3D POSE LIFTING FOR FAST AND ACCURATE HUMAN POSE ESTIMATION

CLAIM OF PRIORITY

This Application is a National Stage Entry of, and claims priority to, PCT Application No. PCT/CN2020/133084, filed on 1 Dec. 2020 and titled "INCREMENTAL 2D-TO-3D POSE LIFTING FOR FAST AND ACCURATE HUMAN POSE ESTIMATION", which is incorporated by reference in its entirety for all purposes.

BACKGROUND

Estimating a 3D human pose from an image or video frame has a wide range of applications such as human action recognition, human robot/computer interaction, augmented reality, animation, gaming, and others. Currently, well-trained Deep Neural Network (DNN) models provide detection of 2D human body joints (i.e., a 2D pose) in images that are accurate and reliable for deployment. Furthermore, 3D human pose regression from such 2D joints may be employed, in which a lifting network instantiated as a fully connected structure or its variants is trained to directly estimate 3D human pose given 2D body joint locations as the input. Such lifting networks may be implemented without need of any additional cues such as source image/video data, multi-view cameras, pose-conditioned priors, etc. and provide improved results relative to other 3D pose estimation techniques. Such lifting networks have shortcomings that are currently being addressed by modifying the architecture of the lifting network. However, the need for more accurate and computationally efficient 3D human pose estimation persists.

There is an ongoing need for high quality and efficient 3D human pose estimation using 2D pose information from an input image, picture, or frame. It is with respect to these and other considerations that the present improvements have been needed. Such improvements may become critical as the implementation of 3D human pose recognition in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
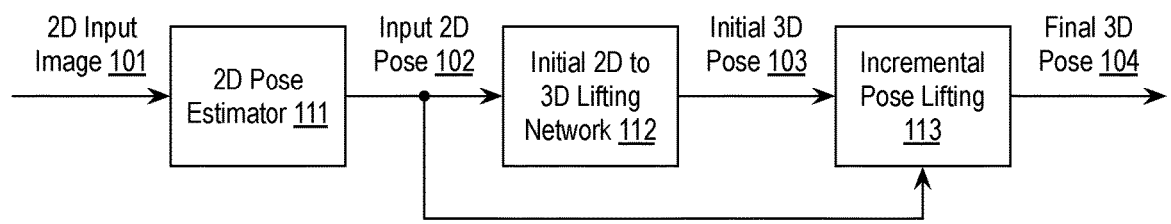
FIG. 1 illustrates an example system to generate a 3D human pose from a 2D input image.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", or examples, or embodiments, etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to incremental 2D to 3D pose lifting including iteratively modifying an initial 3D human pose to a final 3D human pose for improved 3D pose accuracy.

As described above, it is desirable to estimate a 3D human pose from a picture, image, or video frame for use in applications such as human action recognition, human robot/computer interaction, augmented reality, animation, gaming, and others. Herein, the terms picture, image, and video frame are used interchangeably. As used herein, the term 2D human pose indicates a data structure representative of a human form in a 2D image and is inclusive of a data structure indicating 2D key-point/joint locations (in the coordinate system of the 2D image or corresponding to the 2D image) of particular human body parts such as joint locations, head location, pelvis location, etc. in the 2D coordinate system. Such locations may also be labeled with the pertinent body parts. Similarly, the term 3D human pose indicates a data structure indicating 3D key-point/joint locations (in a projected 3D coordinate system corresponding to the 2D image) of particular human body parts in the 3D coordinate system. Such 3D locations may again be labeled with the pertinent body parts. Such a 3D human pose may be characterized as a 3D skeleton. Notably, the 2D body parts and 3D body parts may be the same or they may differ in some aspects such as the 3D pose having more body parts or vice versa.

In some embodiments, a 3D human pose is estimated from an initial 3D human pose generated based on an initial 2D human pose in an input image. As used herein, the term in an input image indicates the pose or features are represented in the input image. The initial 2D human pose may be generated based on the input image using any suitable technique or techniques such as application of a Deep Neural Network (DNN) pretrained to detect 2D human poses. Furthermore, a lifting network may be applied to the initial 2D human pose to generate the initial 3D human pose. As used herein, the term lifting network indicates a fully connected network model or structure (or any of its variants) pretrained to directly estimate a 3D human pose from a 2D human pose (i.e., given 2D body joint locations as an input). A final 3D human pose is then determined based on the initial 3D human pose and the initial 2D human pose in an incremental, iterative manner such that each, in some examples, of the iterations provide coarse to fine adjustments of the 3D human pose to the final 3D human pose. In some embodiments, each iteration includes projecting a prior estimated 3D human pose (e.g., the initial 3D human pose in the first iteration and an iterative 3D human pose in subsequent iterations) to a current projected 2D human pose in the same coordinate system as the initial 2D human pose, generating a feature set using the current projected 2D human pose and the initial 2D human pose (i.e., based on a difference therebetween), applying a current residual regression model to the feature set (e.g., with the residual regression model of each iteration being unique) to generate a current 3D pose increment, and combining (e.g., adding) the current 3D pose increment to the prior estimated 3D human pose to determine a current estimated 3D human pose. The current estimated 3D human pose is then used as the prior estimated 3D human pose for the next iteration or output as the final estimated 3D human pose. It is noted that the residual regression models are trained in conjunction with the lifting network to provide descent directions for the increments of the 3D human pose.

Such techniques provide fast (e.g., typically fewer than five iterations) and accurate (e.g., about 5 to 10 mm reduction in per joint position error) coarse-to-fine 2D to 3D human pose regression that may be used to improve the performance of 3D human pose estimation based on an input image. Such iterative techniques may be used in conjunction with any 2D to 3D human pose lifting network such as fully connected networks (FCN), graph convolutional networks (GCN), locally connected networks (LCN), variants thereof, and others. Notably, such iterative techniques provide a feedback mechanism to optimize the 2D to 3D human pose lifting and to avoid suboptimal 3D pose estimates due to geometric projection ambiguity (e.g., several 3D poses or skeletons corresponding to the same 2D pose or body joints).

FIG. 1 illustrates an example system 100 to generate a 3D human pose from a 2D input image, arranged in accordance with at least some implementations of the present disclosure. As shown in FIG. 1, system 100 includes a 2D pose estimator 111, an initial 2D to 3D lifting network 112, and an incremental pose lifting module 113. System 100 receives a 2D input image 101 and generates a final 3D pose 104 by applying 2D pose estimator 111 to 2D input image 101 to determine an input 2D pose 102 (or initial 2D pose, e.g., a monocular 2D pose input such as body joint locations), applying initial 2D to 3D lifting network 112 to input 2D pose 102 to estimate an initial 3D pose 103, and applying incremental pose lifting module 113 to input 2D pose 102 and initial 3D pose 103 to provide final 3D pose 104. In the following, a human pose is illustrated and discussed for the sake of clarity of presentation. However, system 100 and the components and techniques discussed herein may be applied to any object to provide a final 3D pose using an input image. System 100 may be implemented via any suitable device such as a personal computer, a laptop computer, a tablet, a phablet, a smart phone, a digital camera, a gaming console, a wearable device, a display device, an all-in-one device, a two-in-one device, or the like. For example, system 100 may provide at least a portion of a visual analytics or artificial intelligence processing pipeline that may be implemented in hardware, software, or a combination thereof. In some embodiments, system 100 is implemented, in an implementation phase, in hardware as a system-on-a-chip (SoC). In some embodiments, the SoC is employed as a monolithic integrated circuit (IC). As used herein, the term monolithic indicates a device that is discrete from other devices, although it may be coupled to other devices for communication and power supply.

System 100 receives input image 101 for processing such that input image 101 includes data representative of a scene having a human or other object therein. For example, input image 101 may include a three-channel input image including one channel for each color channel (e.g., RGB, YUV, etc.). 2D pose estimator 111 receives input image 101 and generates input 2D pose 102. 2D pose estimator 111 may implement any suitable 2D pose generation model. In some embodiments, 2D pose estimator 111 implements a deep neural network (DNN) body joint detector. In some embodiments, in addition or in the alternative, a manual 2D body joint labeling may be performed. Input 2D pose 102 may include any suitable data structure representative of a 2D pose including locations and corresponding labels for features of the 2D object in the image such as a human form.

Figure 2:
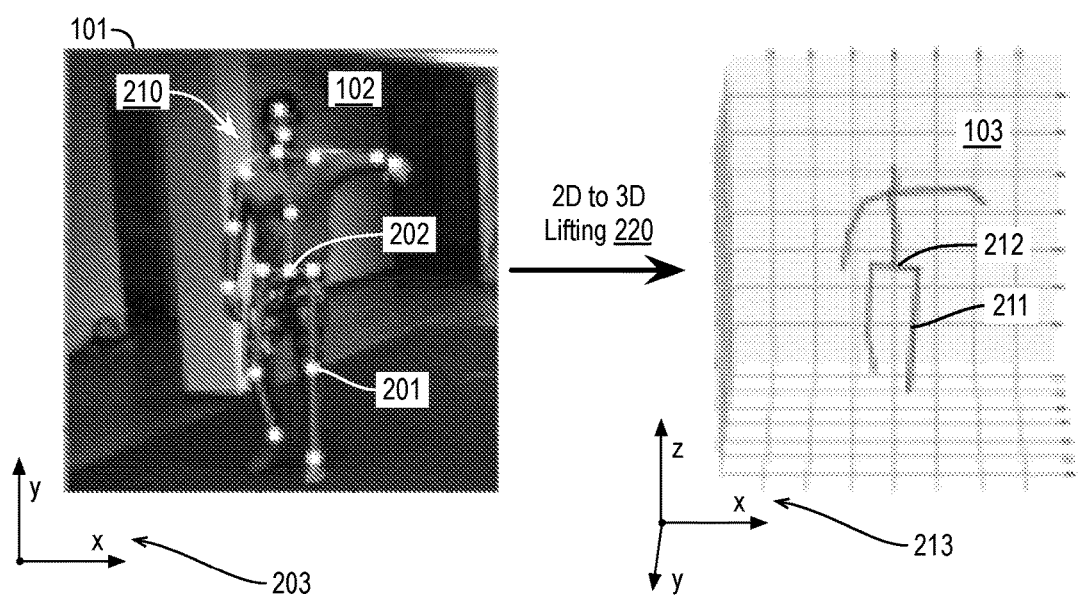
FIG. 2 illustrates an example input image having a representation of a human body, a corresponding example input 2D pose, and a corresponding example initial 3D pose.

FIG. 2 illustrates an example input image 101 having a representation of a human body 210, a corresponding example input 2D pose 102, and a corresponding example initial 3D pose 103, arranged in accordance with at least some implementations of the present disclosure. As shown in FIG. 2, input image 101, such as an RGB image, a YUV image, or a luma only image include a representation of an object, representation of a human body 210, or the like. As discussed, input 2D pose 102 is detected or labeled within input image 101 such that input 2D pose 102 includes any number of labeled key-point/joint locations (in 2D) including labeled locations 201, 202. For example, the data structure of labeled location 201 may be include a label such as a knee joint, a left knee joint, or the like, and a corresponding location in 2D image coordinate system 203. Similarly, the data structure of labeled location 202 may include a label such as a pelvis, pelvic bone, or the like, and a corresponding location in 2D image coordinate system 203. 2D image coordinate system 203 may be provided in pixel locations, pixel coordinates, or any other suitable 2D coordinate system that provides locations within input image 101 and locations within projections to the same 2D image coordinate system 203 as input image 101. Input 2D pose 102 may include any number of similar labeled locations inclusive of left and right shoulder locations, left and right elbow locations, left and right wrist locations, a sternum or body center location, left and right knee locations, left and right ankle locations, and so on.

Returning to FIG. 1, initial 2D to 3D lifting network 112 receives input 2D pose 102 and initial 2D to 3D lifting network 112 generates initial 3D pose 103. Initial 2D to 3D lifting network 112 may implement any suitable model to generate initial 3D pose 103 using input 2D pose 102. In some embodiments, initial 2D to 3D lifting network 112 implements pretrained fully connected networks (FCN). In some embodiments, initial 2D to 3D lifting network 112 implements pretrained graph convolutional networks (GCN). In some embodiments, initial 2D to 3D lifting network 112 implements pretrained locally connected networks (LCN). Variants of such FCNs, GCNs, LCNs or other networks may be employed. Notably, initial 2D to 3D lifting network 112 generates initial 3D pose 103 using input 2D pose 102 without any additional inputs such as source image/video data, multi-view cameras, pose-conditioned priors, and so on. Initial 3D pose 103 may include any suitable data structure representative of a 3D pose such as key-point/joint locations and corresponding labels for features of the 3D object corresponding to the 2D object.

With reference to FIG. 2, example initial 3D pose 103 is illustrated corresponding to the example input 2D pose 102. As shown, after 2D to 3D lifting operation 220, as performed by 2D to 3D lifting network 112, initial 3D pose 103 is generated such that initial 3D pose 103 includes any number of labeled key-point/joint locations (in 3D) including labeled locations 211, 212. In the following any such locations may be characterized as key-point locations or joint locations. For example, the data structure of labeled location 211 may include a label such as a knee joint, a left knee joint, or the like, and a corresponding location in 3D coordinate system 213. In the same manner, the data structure of labeled location 212 may be include a label such as a pelvis, pelvic bone, or the like, and a corresponding location 3D coordinate system 213. 3D coordinate system 213 may be provided in physical distance values or any other suitable 3D coordinate system that provides locations within 3D space. Initial 3D pose 103 may include any number of similar labeled locations inclusive of left and right shoulder locations, left and right elbow locations, left and right wrist locations, a sternum or body center location, left and right knee locations, left and right ankle locations, and so on.

Furthermore, herein, 2D image locations, 2D pose locations, 2D differences, etc. are provided relative to or in 2D image coordinate system 203. Such 2D image locations, pose locations, and 2D differences include, for example, projected 2D poses (i.e., projected from 3D poses), differences between a projected 2D pose and input 2D pose 102, and the like. In a similar manner, herein, 3D pose locations, 3D differences, 3D additions or combinations, etc. are provided relative to or in 3D coordinate system 213. For example, iterative 3D poses, 3D pose increments, and similar data structures are provided in 3D coordinate system 213. Furthermore, terms inclusive of adding or differencing relative to pose data indicates an element by element adding or differencing for matching elements of the poses. For example, when two poses are added or differenced, the left elbow positions are added or differenced, the right wrist positions are added or differenced, and so on. Furthermore, such adding or differencing is performed for each component ((x, y) or (x, y, z)) of each position.

Returning to FIG. 1, incremental pose lifting module 113 receives input 2D pose 102 and initial 3D pose 103. Using input 2D pose 102 and initial 3D pose 103, incremental pose lifting module 113 generates final 3D pose 104, which may have any suitable data structure as discussed with respect to initial 3D pose 103. Incremental pose lifting module 113 generates final 3D pose 104 by iteratively projecting a prior estimated 3D human pose (i.e., initial 3D pose 103 in a first iteration) to a current projected 2D human pose, generating a feature set using the current projected 2D human pose and the initial 2D human pose, applying a current residual regression model to the feature set, and combining the current 3D pose increment to the prior estimated 3D human pose to determine a current estimated 3D human pose, which is then used as the prior estimated 3D human pose for the next iteration or output as final 3D pose 104.

Final 3D pose 104 may be output for use by any suitable components, applications, or modules of system 100 (not shown). In some embodiments, final 3D pose 104 is implemented in a human action recognition application. In some embodiments, final 3D pose 104 is implemented in human robot/computer interaction application. In some embodiments, final 3D pose 104 is implemented in an augmented reality application. In some embodiments, final 3D pose 104 is implemented in an animation application. In some embodiments, final 3D pose 104 is implemented in a gaming application. In some embodiments, final 3D pose 104 is implemented in an artificial intelligence application. In some embodiments, final 3D pose 104 is implemented in a virtual reality application.

Figure 3:
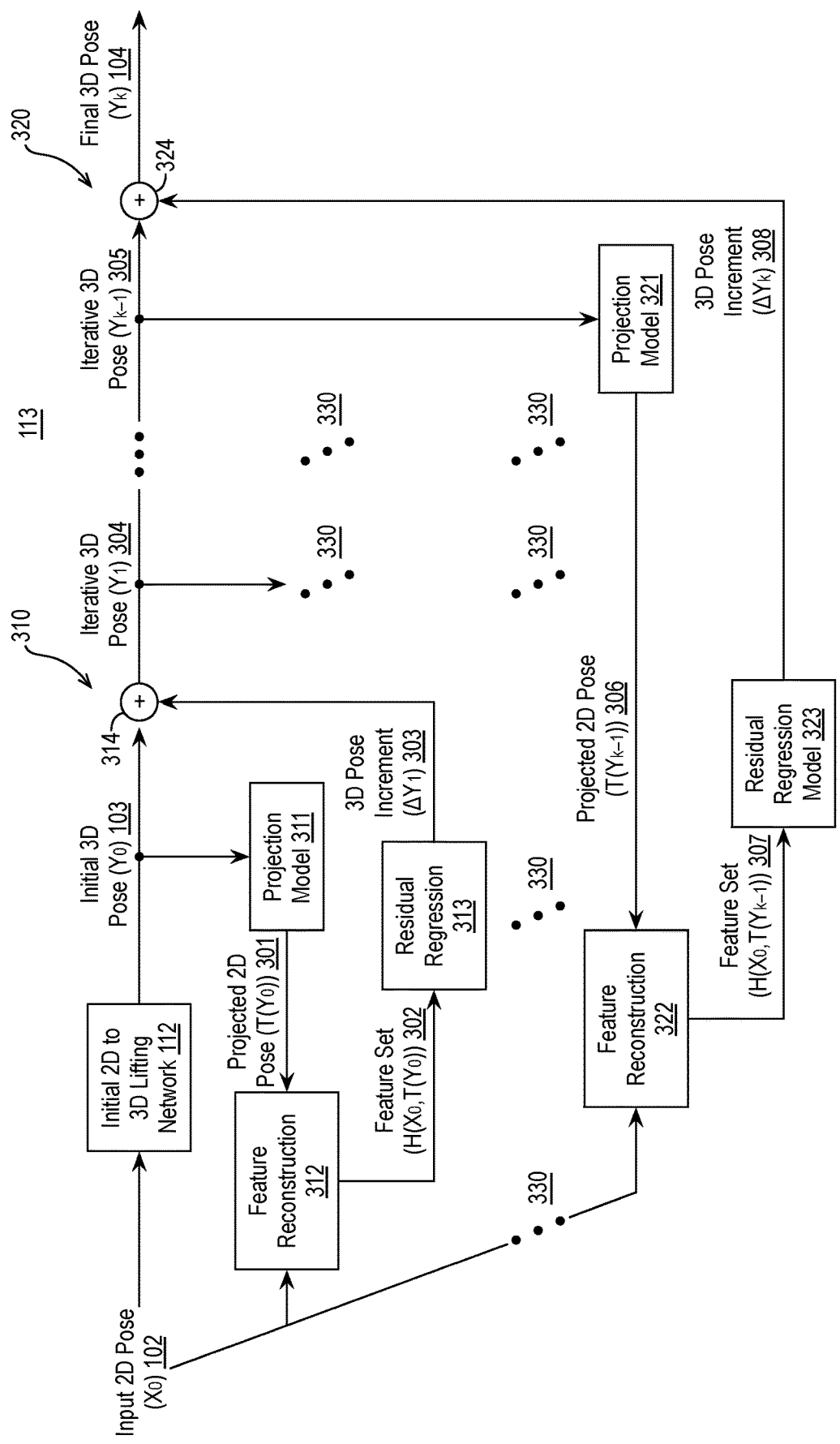
FIG. 3 illustrates an example implementation of an initial 2D to 3D lifting network and an incremental pose lifting module to generate a final 3D pose.

FIG. 3 illustrates an example implementation 300 of initial 2D to 3D lifting network 112 and incremental pose lifting module 113 to generate final 3D pose 104, arranged in accordance with at least some implementations of the present disclosure. As shown in FIG. 3, incremental pose lifting module 113 includes a number of adders including adders 314, 324, a number of projection models including projection models 311, 321, a number feature reconstruction modules including feature reconstruction modules 312, 322, and a number of residual regression modules such as residual regression modules 313, 323. It is noted that adders 314, 324 may be implemented the same adder or different adders, projection models 311, 321 may be implemented by the same projection model or different projection models, and feature reconstruction modules 312, 322 may be implemented by the same reconstruction module or different reconstruction modules. However, residual regression modules 313, 323 are implemented by different residual regression modules employing different residual regression model parameters (although they may be implemented by the same or shared compute resources).

As discussed with respect to FIG. 1, initial 2D to 3D lifting network 112 generates initial 3D pose 103 ($Y_0$) based on input 2D pose 102 ($X_0$) via, for example, a fully connected network. For example, given a dataset of N human pose samples, $x_0 = \{x_0^i\}_{i=1}^N$ may define the gallery of 2D joints of a human pose and $Y = \{y^i\}_{i=1}^N$ may define the gallery of 3D joints in a predefined 3D space (i.e., in 3D coordinate system 213) where $x_0^i \varepsilon R^{2J}$, $y^i \varepsilon R^{3J}$, and J is the number of joints for the body pose or body skeleton. As used herein, the terms body pose and body skeleton are used interchangeably. In such contexts, $x_0^i$ may be ground truth 2D joint locations (in a training phase) or outputs of 2D pose estimator 111 (in an implementation phase, please refer to FIG. 1). Via application of initial 2D to 3D lifting network 112 to input 2D pose 102 ($X_0$), initial 3D pose estimates, initial 3D pose 103 denoted as $Y_0 = \{y_0^i\}_{i=1}^N$ are generated. It is noted that the one-step regression (i.e., initial 2D to 3D lifting network 112) lacks a feedback mechanism in the optimization to compensate for potentially weak estimation results and, due to geometric projection ambiguity, there may exist a few 3D body skeletons corresponding to the same 2D body joints input, which may cause suboptimal 3D pose estimation results. To resolve such concerns, and others, incremental pose lifting module 113 is employed.

Notably, incremental pose lifting module 113 includes any number of iterations illustrated with respect to a first temporal iteration 310 (including adder 314, projection model 311, feature reconstruction module 312, and residual regression module 313) and a final temporal iteration 320 (including adder 324, projection model 321, feature reconstruction module 322, and residual regression module 323). Notably, incremental pose lifting module 113 may employ any number of intervening iterations 330 (each including an adder, projection model, feature reconstruction module, and residual regression module) between first temporal iteration 310 and final temporal iteration 320. In some embodiments, incremental pose lifting module 113 employs not more than seven total iterations. In some embodiments, incremental pose lifting module 113 employs not more than five total iterations. In some embodiments, incremental pose lifting module 113 employs four total iterations. In some embodiments, incremental pose lifting module 113 employs three total iterations.

As shown, in first temporal iteration 310, projection model 311 (T) is applied to initial 3D pose 103 ($Y_0$) to generate a projected 2D pose 301 ($T(Y_0)$). Projected 2D pose 301 may be generated using any suitable technique or techniques. In some embodiments, projected 2D pose 301 is generated based on a projection model, T, using perspective projection. For example, perspective projection may project from a 3D pose to a projected 2D pose using intrinsic camera parameters and a global position of a root body joint such as a pelvis of a human pose. In some embodiments, the intrinsic camera parameters are obtained via metadata corresponding to 2D input image 101 (i.e., via an EXIF, exchangeable image file format, file corresponding to 2D input image 101). In some embodiments, the root body joint is estimated using direct SVD (singular value decomposition) regression or a learning based model. For example, a network or other machine learning model may be trained to detect the root body joint in initial 3D pose 103. Using the intrinsic camera parameters and the root body joint, perspective projection may be used to generate projected 2D pose 301 from initial 3D pose 103.

As shown, input 2D pose 102 and projected 2D pose 301 are provided to feature reconstruction module 312, which generates a feature set 302 ($H(X_0, T(Y_0))$). Feature set 302 may be any suitable set of available features generated using input 2D pose 102 and projected 2D pose 301. In some embodiments, feature set 302 is a set of differences (e.g., a set of element by element differences for each feature) between input 2D pose 102 and projected 2D pose 301 (i.e., $H = X_0 - T(Y_0)$). Feature set 302 is provided to residual regression module 313, which applies a regression model to feature set 302 to generate a 3D pose increment 303 ($\Delta Y_1$). Residual regression module 313 may employ any suitable regression model such as a neural network structure as discussed with respect to FIG. 5. 3D pose increment 303 may include any suitable data structure such as an increment in x, y, z for each location of the 3D pose (i.e., $\Delta x$, $\Delta y$, $\Delta z$ for left elbow, $\Delta x$, $\Delta y$, $\Delta z$ for right elbow, and so on). Adder 314 receives 3D pose increment 303 and initial 3D pose 103 and adder 314 combines or adds 3D pose increment 303 to initial 3D pose 103 (e.g., via element by element addition) to generate an iterative 3D pose 304 ($Y_1$).

Such processing is then repeated for any number of intervening iterations 330 to generate iterative 3D pose 305 ($Y_{k-1}$), which represents a second to last iteration as performed by incremental pose lifting module 113. In various embodiments, one, two, three, or four intervening iterations are performed. In some embodiments, no intervening iterations are performed. Notably, convergence may be found using not more than five total iterations (e.g., iteration 310, iterations 330, and iteration 320) with four iterations typically providing convergence. Furthermore, as discussed, each iteration employs a unique residual regression module such that each employs different parameters. Each residual regression module may have the same or different architecture and may employ the same or different regression model.

As shown, in final temporal iteration 320, projection model 321 (T) is applied to iterative 3D pose 305 ($Y_{k-1}$) to generate a projected 2D pose 306 ($T(Y_{k-1})$). Projected 2D pose 306 may be generated using any techniques discussed with respect to projected 2D pose 301. Projected 2D pose 306 and input 2D pose 102 are provided to feature reconstruction module 322, which generates a feature set 307 ($H(X_0, T(Y_{k-1}))$). Feature set 307 may be any suitable set of available features generated using input 2D pose 102 and projected 2D pose 301. In some embodiments, feature set 307 is a set of differences (element by element) between input 2D pose 102 and projected 2D pose 306 (i.e., $H = X_0 - T(Y_{k-1})$). In some embodiments, each iteration uses the same types of feature sets. In some embodiments, different types of feature set(s) are employed by one or more iterations Feature set 306 is provided to residual regression module 323, which applies a regression model to feature set 306 to generate a 3D pose increment 308 ($\Delta Y_k$). Adder 324 receives 3D pose increment 308 and iterative 3D pose 305 and adder 324 combines or adds 3D pose increment 308 and iterative 3D pose 305 to generate final 3D pose 104 ($Y_k$), which is output as discussed with respect to FIG. 1.

For example, incremental pose lifting module 113 provides a residual feedback mechanism employed via iterative 3D pose projection to a 2D projected pose, feature reconstruction using a 2D projected pose and the initial 2D pose (input 2D pose 102), application of a residual regression model to the feature set to generate a 3D pose increment, and addition of the 3D pose increment to the 3D pose. Given K iterations (and a corresponding K residual regressors to progressively update the 3D pose estimate), for example, incremental pose lifting module 113 projects the previous 3D pose estimate, $Y_{k-1}$, back to 2D space, regresses a 3D pose increment, $\Delta Y_k$, from the reconstructed features in 2D space, and determines the current 3D pose estimate, $Y_k$. In some embodiments, the current 3D pose estimate, $Y_k$, is determined in an additive manner as shown in Equation (1):

$$Y_k = Y_{k-1} + \Delta Y_k \quad (1)$$

where $Y_k$ is the current 3D pose estimate, $Y_{k-1}$ is the prior 3D pose estimate, and $\Delta Y_k$ is the 3D pose increment.

As discussed with respect to residual regression modules such as residual regression modules 313, 323, the 3D pose increment, $\Delta Y_k$, is determined by applying a pretrained residual regression model such as a fully connected network or other machine learning model to a feature set based on input 2D pose 102 and projection of a 3D pose estimate to 2D space. In some embodiments, the 3D pose increment is generated as shown in Equation (2):

$$\Delta Y_k = R_k(H(X_0, T(Y_{k-1}))) \quad (2)$$

where $\Delta Y_k$ is the 3D pose increment, $R_k$ is the residual regressor for the $k^{th}$ iteration to update the previous 3D pose estimate, $Y_{k-1}$, H is the feature set, $X_0$ is the initial 2D pose, T is the known projection model to map $Y_{k-1}$ to 2D space, and $Y_{k-1}$, as mentioned, is the previous 3D pose estimate. It is noted that the residual regressor, $R_k$, is dependent both the projection model, T, and the reconstructed features, H.

In some embodiments, the feature set, H, includes or is the residual difference between input 2D pose 102 and the projected 2D pose. For example, the residual difference may be defined as the input features to train (in a training phase) and employ (in an implementation phase) the residual regressors. In some embodiments, the feature set is defined as shown in Equation (3):

$$H(X_0, T(Y_{k-1})) = X_0 - T(Y_{k-1}) \quad (3)$$

where H is the feature set, $X_0$ is the initial 2D pose, T is the known projection model to map $Y_{k-1}$ to 2D space, and $Y_{k-1}$ is the previous 3D pose estimate. It has been determined that such 2D pose residual features are compact and discriminative as they explicitly encode the discrepancy between the initial input and the back-projected estimate in 2D pose space. Transferring them into a 3D pose increment builds up a bidirectional feature relation in both 2D and 3D pose spaces for improved results.

Thereby, system 100 (via implementation of initial 2D to 3D lifting network 112 and incremental pose lifting module 113) provides an incremental 2D to 3D pose lifting (IPL) for improved human pose regression. As discussed, the IPL employs a residual feedback technique that projects a current 3D pose estimation back to the 2D space of the input image and determines a residual difference between the initial 2D pose input and the back-projected 2D pose estimate. The 2D pose residual serves as a strong feature constraint to reduce 3D pose regression error via mapping it to a 3D pose increment. Furthermore, the residual feedback scheme may be employed with a coarse-to-fine optimization strategy to minimize an error function measuring the bidirectional feature relation from the 2D pose residuals to the corresponding 3D pose increments in an incremental manner. For example, as discussed further herein, in some embodiments, with IPL, during training, a sequence of descent directions is learned and encoded with a shared lightweight differentiable structure over training data iteratively. In implementation, given an unseen 2D pose sample, a 3D pose increment is generated by projecting the current sample-specific 2D pose residual onto each learnt descent direction progressively, refining 3D pose estimate from coarse-to-fine. As a result, the IPL is easy to implement and provides generalization ability.

Figure 4:
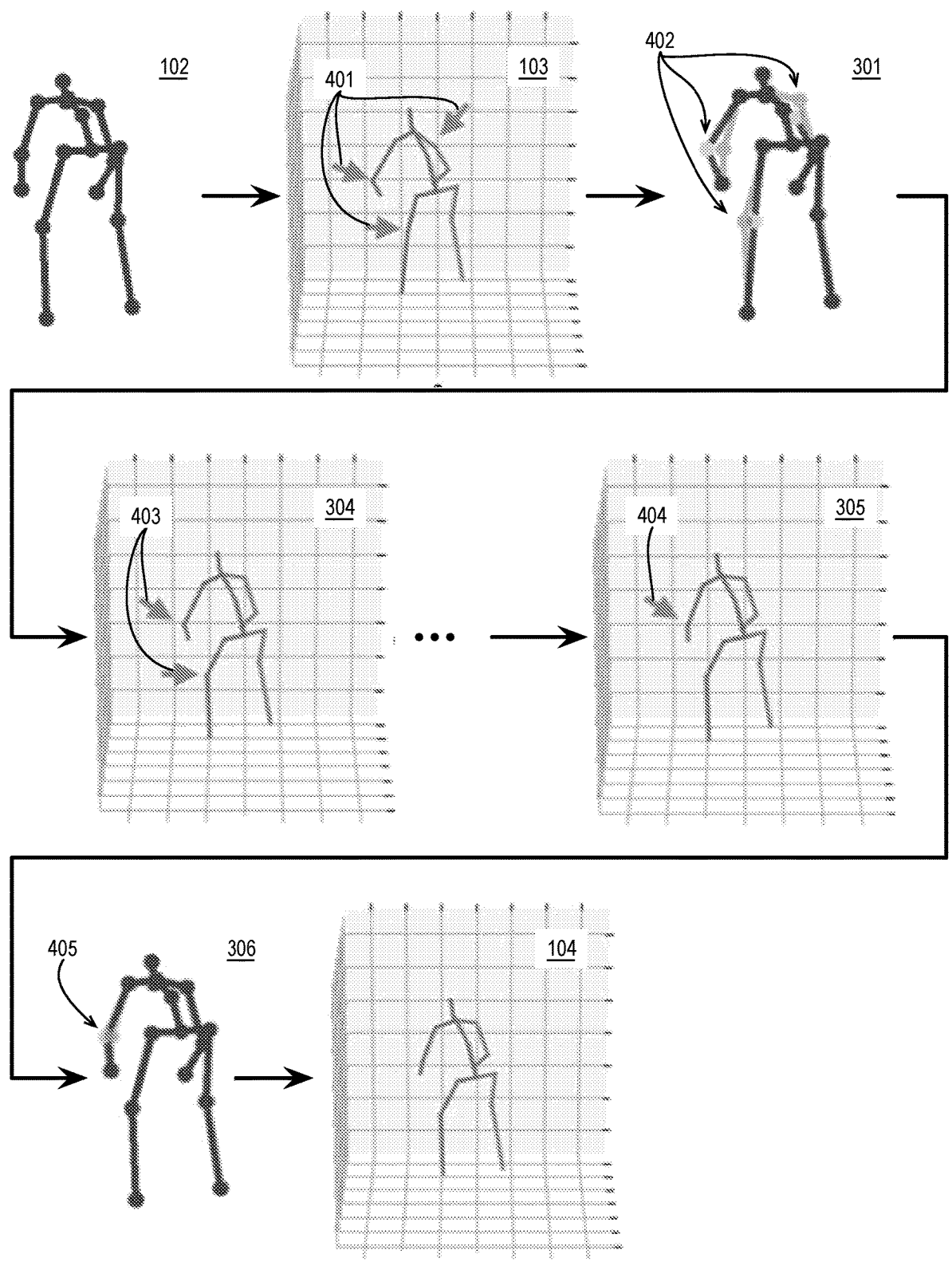
FIG. 4 illustrates exemplary 2D human poses and 3D human poses as the operations of the implementation of FIG. 3 are performed.

FIG. 4 illustrates exemplary 2D human poses and 3D human poses as the operations of implementation 300 are performed, arranged in accordance with at least some implementations of the present disclosure. As shown in FIG. 4, input 2D pose 102 includes a number of key-point/joint locations in 2D space (illustrated as dots) such as locations of joints of a human skeleton. Notably, it is the purpose of implementation 300 to efficiently and accurately generate a 3D pose corresponding to input 2D pose 102. As shown, processing progresses by the generation of initial 3D pose 103 via initial 2D to 3D lifting network 112. Initial 3D pose 103 provides locations of the joints of the human skeleton in 3D space as illustrated using a stick figure. Furthermore, as illustrated by arrows 401 (based on known ground truth information, for example), initial 3D pose 103 has errors that require movement of particular joints (e.g., a right wrist, left shoulder and right knee in the illustrated example).

As part of the discussed iterative processing, projected 2D pose 301 is generated based on initial 3D pose 103 via projection model 311. Projected 2D pose 301 is shown as overlaid with respect to input 2D pose 102 and indicates differences 402 between projected 2D pose 301 and input 2D pose 102. Processing continues with the generation of iterative 3D pose 304 via feature reconstruction module 312, residual regression module 313, and adder 314. As illustrated by arrows 403, iterative 3D pose 304 continues to have errors that require movement of particular joints (e.g., a right wrist and right knee in the illustrated example). However, such errors are fewer, smaller errors relative to initial 3D pose 103. Iterative processing continues, as discussed, through the generation of iterative 3D pose 305. As again illustrated by arrow 404, iterative 3D pose 305 has fewer and smaller errors relative to iterative 3D pose 304.

Iterative 3D pose 305 is then projected to 2D space to generate projected 2D pose 306, which is shown overlaid with respect to input 2D pose 102. Such overlay indicates a difference 405 between iterative 3D pose 305 and input 2D pose 102. Processing continues with the generation of final 3D pose 104 via feature reconstruction module 322, residual regression module 323, and adder 324 such that final 3D pose 104 provides a 3D pose that, when projected to 2D space, more faithfully represents to input 2D pose 102. Notably, such processing may provide a coarse-to-fine regression approach such that the iterative human pose increments (i.e., $\Delta Y_k$) are coarse to fine increments with a 3D human pose increment that is a temporally first human pose increment having a larger increment measure than a temporally final 3D human pose increment of the iterative 3D human pose increments. For example, the increment measure may be a measure, in 2D or 3D space, representative of a sum of total movement of the joints of the human model (e.g., a sum of squares of a 3D pose increment, a sum of absolute values of a 3D pose increment, a sum of squares of a feature set of differences, or a sum of absolute values of a feature set of differences). Such decreases in increment size may be provided in each iteration.

Notably, in the presence of large 2D pose variations and complex 2D-to-3D pose correspondences, the IPL discussed herein introduces a set of K residual regressors to progressively update the 3D pose estimate. In some embodiments, the early residual regressors compensate for large 3D pose error fluctuations, while the latter residual regressors perform minor adjustments, which provides generalization and accuracy on large-scale datasets. In some embodiments, the IPL converges with not more than four residual regressors and four total iterations may be used.

In some embodiments, each residual regressor (i.e., residual regression modules 313, 323 and any intervening residual regression modules) learns a descent direction during pretraining. By projecting reconstructed 2D pose features on the learnt descent direction of a residual regressor, the sample-specific 3D pose increment may be generated to refine the previous 3D pose estimate. As discussed, each residual regressor may have the same architecture or they may be different. In some embodiments, each residual regressor employs a specialized neural network (e.g., a same or shared structure for all residual regressors). In some embodiments, the network includes two fully connected (FC) layers (one to increase the dimensionality of the input and the other to predict a 3D pose vector) and a residual block having two hidden layers (e.g., each having a number hidden nodes and followed by dropout). In some embodiments, the first FC layer is followed by the operations of batch normalization, ReLU (Rectified Linear Unit processing), and dropout.

Figure 5:
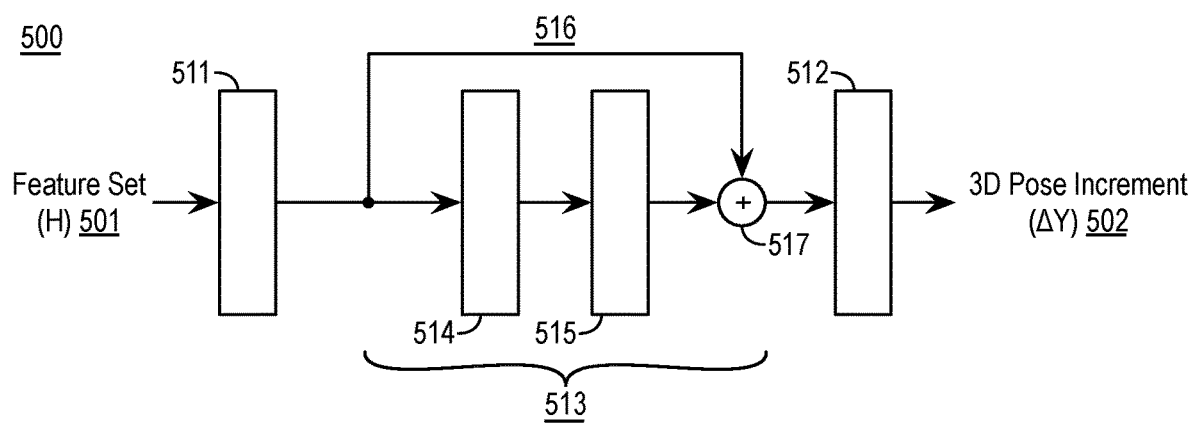
FIG. 5 illustrates an example neural network to generate a 3D pose increment based on an input feature set.

FIG. 5 illustrates an example neural network 500 to generate a 3D pose increment based on an input feature set, arranged in accordance with at least some implementations of the present disclosure. For example, neural network 500 may be implemented via any of residual regression modules 313, 323 and any intervening residual regression modules. Neural network 500 receives an input feature set 501, which may have any characteristics discussed with respect to feature sets 302, 307. For example, input feature set 501 may be an input feature vector including a set of 2D differences (e.g., in 2D image coordinate system 203) for particular components of a human body. Neural network 500 generates, based on input feature set 501, a 3D pose increment 502 ($\Delta Y$), which may have any characteristics discussed with respect to 3D pose increments 303, 308. For example, 3D pose increment 502 may be an output feature vector including a set of 3D differences for particular components of a human body (e.g., in 3D coordinate system 213).

As shown in FIG. 5, neural network 500 includes a fully connected layer 511 and a fully connected layer 512 separated by a residual block 513. Fully connected layer 511 receives feature set 501 and increases the dimensionality of input feature set 501. In some embodiments, fully increases the dimensionality of input feature set 501 to 256 or a vector length of 256 (e.g., from J*2 to 256, where J is the number of body joints). In some embodiments, fully connected layer 511 includes or is followed by (prior to residual block 513) a batch normalization layer, a ReLU layer, and a dropout layer to apply a particular drop out ratio such as 0.25. Residual block 513 includes hidden layers 514, 515, a residual connection 516, and a residual adder 517. In some embodiments, each of hidden layers 514, 515 has a number of nodes equal to the dimensionality of the output of fully connected layer 511 (e.g., 256 nodes). In some embodiments, each of hidden layers 514, 515 is followed by a dropout with a particular drop out ratio such as 0.25. Fully connected layer 511 receives the output from adder 517 (e.g., a sum of the output from hidden layer 515 and features carried forward from fully connected layer 511). Fully connected layer 511 predicts 3D pose increment 502 for use as discussed herein.

Neural network 500 provides a lightweight (e.g., about 0.15 million parameters) and efficient machine learning model to predict 3D pose increment 502 from input feature set 501. Neural network 500 may be employed by any or all of residual regression modules 313, 323 and any intervening residual regression modules. Furthermore, neural network 500 as employed by such residual regressors may be trained as discussed herein with respect to FIG. 7.

Figure 6:
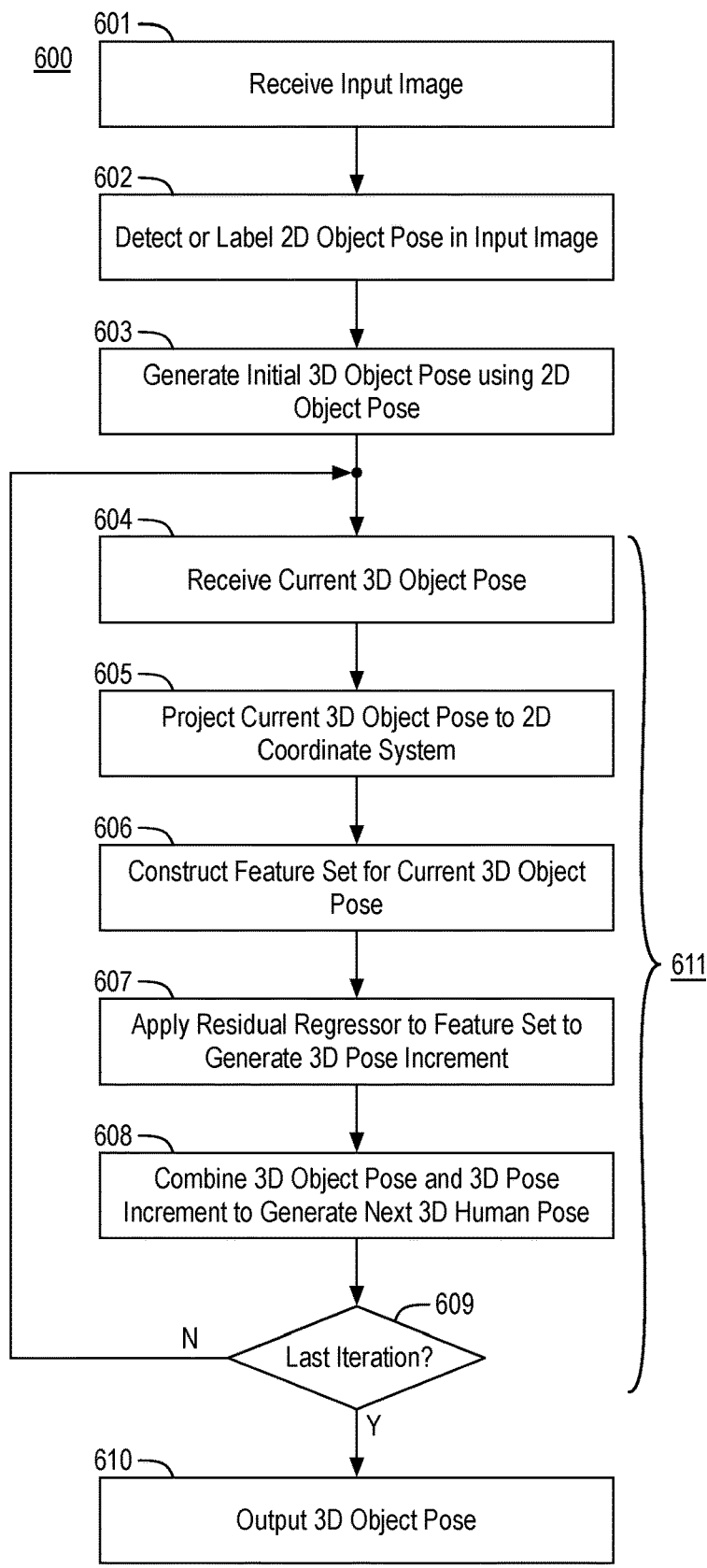
FIG. 6 illustrates an example process for estimating a 3D pose for an object or person represented in an input image.

FIG. 6 illustrates an example process 600 for estimating a 3D pose for an object or person represented in an input image, arranged in accordance with at least some implementations of the present disclosure. Process 600 may include one or more operations 601-610. For example, operations 601-610 may be performed by system 100 as part of an action recognition application, a robot/computer interaction application, an augmented reality application, an animation application, a gaming application or the like.

Processing begins at operation 601, where an input image is received for processing The input image may be a three-channel input image including one channel for each color channel (e.g., RGB, YUV, etc.), a luma-channel only input image or other image representative of a scene including an object of interest such as a human form.

Processing continues at operation 602, where a 2D object pose is detected or labeled in the input image. The 2D object pose may have any suitable data structure such as locations of key-points (and corresponding labels for the points) of the 2D object in a 2D or image coordinate system. For example, the 2D object may reticulate in 3D space and the 2D object pose may correspond to a particular 3D object pose such that it is the goal of process 600 to accurately predict the 3D object pose from the 2D object pose as detected in the input image. The 2D object pose may be detected or labeled using any suitable technique or techniques. In some embodiments, the 2D object pose is detected via application of a machine learning model such as a pretrained deep neural network. In some embodiments, the 2D object pose is labeled manually.

Processing continues at operation 603, where an initial 3D object pose is generated from the 2D object pose. The initial 3D object pose may be generated using any suitable technique or techniques such as application of a machine learning model. For example, the machine learning model may be a fully connected network, a graph convolution network, a locally connected network, or the like. In some embodiments, the machine learning model generates the initial 3D object pose from the 2D object pose without use of any other information than the 2D object pose.

Processing continues at operation 604, which is part of an iterative process 611 inclusive of operations 604-609. At operation 604, a current 3D object pose is received. At a first iteration of iterative process 611, the current 3D object pose is the 3D object pose generated at operation 603. At subsequent operations, the current 3D object pose is a 3D object pose generated at operation 608, as discussed herein.

Processing continues at operation 605, where the current 3D object pose is projected from a 3D coordinate system to the 2D coordinate system of the 2D object pose detected at operation 602 or corresponding thereto. For example, both the projected 2D pose and the 2D object pose may be in the original 2D coordinate system of the detected 2D object pose or another 2D coordinate system selected for such purposes. The 3D object pose may be projected from the 3D coordinate system to the 2D coordinate system using any suitable technique or techniques. In some embodiments, the projection from the 3D coordinate system to the 2D coordinate system applies a perspective projection. In some embodiments, the projection from the 3D coordinate system to the 2D coordinate system applies a perspective projection based on intrinsic camera parameters for the camera used to attain the input image received at operation 601 and a root global position of a root feature of the 3D object pose.

Processing continues at operation 606, where a feature set is constructed for the current 3D object pose. The feature set may include any suitable features based on the projected 2D object pose in the 2D coordinate system and the 2D object pose detected at operation 602 (e.g., an input 2D object pose). In some embodiments, the feature set includes element by element differences in 2D space (e.g., $\Delta x$, $\Delta y$ for each labeled element) between the 2D object pose detected at operation 602 and the projected 2D object pose generated at operation 605. In some embodiments, the feature set may include other features.

Processing continues at operation 607, where a residual regressor is applied to the feature set generated at operation 606 to generate a 3D pose increment for the current 3D object pose. the 3D pose increment may include any suitable data structure to increment the 3D pose increment. In some embodiments, the 3D pose increment includes a $\Delta x$, $\Delta y$, $\Delta z$ (in the 3D space) for each labeled element of the 3D object pose. In some embodiments, as iterative process 611 progresses, a measure of the 3D pose increment (e.g., a sum of absolute values or a sum of squares of the increment values) decreases as the iterations progress.

Processing continues at operation 608, where the 3D pose increment and the current 3D object pose (received at operation 604) are combined to generate a next 3D object pose. The 3D pose increment and the current 3D object pose may be combined using any suitable technique or techniques. In some embodiments, the 3D pose increment and the current 3D object pose are added to determine the current 3D object pose.

Processing continues at decision operation 609, where a determination is made as to whether the current iteration of iterative process 611 is a last iteration. Such a determination may be made using any suitable technique or techniques. In some embodiments, iterative process 611 performs a predetermined number of iterations. In some embodiments, iterative process 611 is complete after a measure of convergence is attained such as a measure of the 3D pose increment (e.g., a sum of absolute values or a sum of squares of the increment values) being less than a threshold value or a measure of 2D pose difference (e.g., a sum of absolute values or a sum of squares of differences between the current 2D projection and the 2D input pose) being less than a threshold. If the current iteration is not deemed to be a final iteration, processing continues at operation 604 as discussed above.

If the current iteration is deemed to be a final iteration, processing continues at operation 610, where the 3D object pose generated at operation 608 is provided as an output. The output 3D object pose may be used in any suitable context such as in one or more of an action recognition, a robot/computer interaction, an augmented reality, an animation, or a gaming context. Notably, process 600 provides an inference or implementation process for generating a 3D object pose from an input image, picture, video frame, or the like. Given an unseen 2D pose sample (either detected by a 2D detector or manually labeled) and an initial 3D pose estimate by any lifting network, a 3D pose increment is generated by projecting the current sample-specific 2D pose residual onto each learnt descent direction (e.g., encoded by residual regressor) progressively, refining the 3D pose estimate from coarse to fine, in an additive manner, for example.

Figure 7:
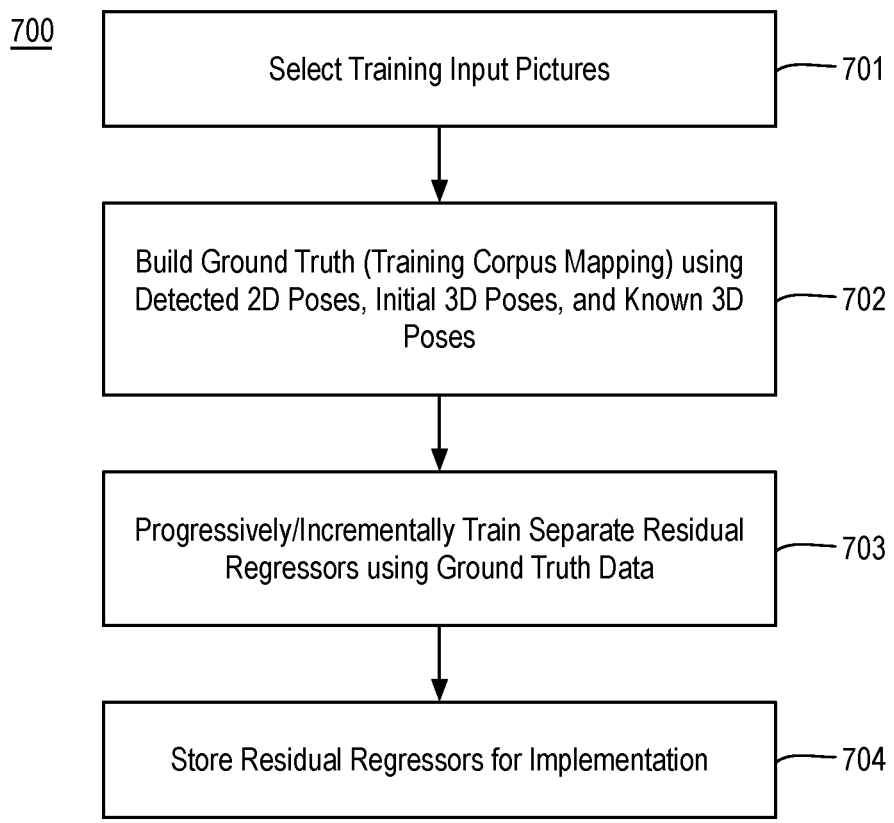
FIG. 7 is a flow diagram illustrating an example process 700 for progressively/incrementally training residual regressors for deployment in an incremental pose lifting module.

FIG. 7 is a flow diagram illustrating an example process 700 for progressively/incrementally training residual regressors for deployment in an incremental pose lifting module, arranged in accordance with at least some implementations of the present disclosure. For example, residual regressors or residual regressor models as implemented by residual regression modules of incremental pose lifting module 113 such as residual regression modules 313, 323 may be trained via process 700. In some embodiments, one or more of the residual regressors or residual regressor models have an architecture as discussed with respect to FIG. 5. Process 700 may include one or more operations 701-704 as illustrated in FIG. 7. Process 700 may be performed by a device or system to generate K pretrained residual regressors for deployment in an implementation or inference stage. Notably, in process 700, a next residual regressor is trained using ground truth data, the initial 2D pose, and the 3D pose estimate by the current residual regressor. Such residual regressors may have the same or different structures.

Process 700 begins at operation 701, where a set of training images, pictures, video frames, etc. are selected for training. The set of training images may include any suitable set of training images such as a set of images with a variety of scenes and objects such as persons in a variety of positions. For example, process 700 may be employed to train residual regressors for any suitable object pose such as human pose prediction. The training images may further be at a variety of resolutions, complexities, etc. Any number of training images may be used for the training set such as thousands, tens of thousands, or more.

Processing continues at operation 702, where ground truth information is built to provide a training corpus mapping. The training corpus mapping may map detected 2D poses and initial 3D poses as generated using the same techniques to be used in deployment (e.g., 2D pose detection from each 2D training image and 2D to 3D pose lifting applied to each detected 3D pose) to ground truth final 3D pose information. Such ground truth final 3D pose information may be generated manually for example.

Processing continues at operation 703, where the ground truth information training mapping discussed with respect to operation 702 is used to progressively/iteratively train separate residual regressors (e.g., each residual regressor has unique parameters). Notably, the residual regressors correspond to K residual regressors to be employed as discussed with respect to implementation 300. Such residual regressors are trained in concert with one another to attain final trained residual regressors. In some embodiments, such training learns a sequence of descent directions encoded with a shared lightweight differentiable structure over training data iteratively. For example, such residual regressors may employ a lightweight machine learning model such as neural network 500. During training, such descent directions are trained and learned for deployment in an implementation phase. Such training may be performed using any suitable technique or techniques. In some embodiments, the discussed incremental 2D to 3D pose lifting model (IPL) learns each residual regressor, $R_k$, by minimizing an error function as shown in Equation (4):

$$\operatorname*{argmin}_{R_k} \lVert Y - (Y_{k-1} + R_k(H(X_0, T(Y_{k-1})))) \rVert \qquad (4)$$

where $R_k$ is the trained regressor, Y is the ground truth pose estimate, H is the feature set, $X_0$ is the initial 2D pose, T is the known projection model to map $Y_{k-1}$ to 2D space, and $Y_{k-1}$ is the previous 3D pose estimate.

Processing continues at operation 704, where the residual regressors are stored for subsequent implementation. For example, parameters characteristic of each of the residual regressors may be stored to memory in any suitable data structure(s). As discussed, such residual regressors have unique parameters (e.g., >50% difference between any two residual regressors or more such as completely different parameter values). In some embodiments, each of the residual regressors have the same architectures or structures. In some embodiments, the architectures are different between two or more of the residual regressors.

Figure 8:
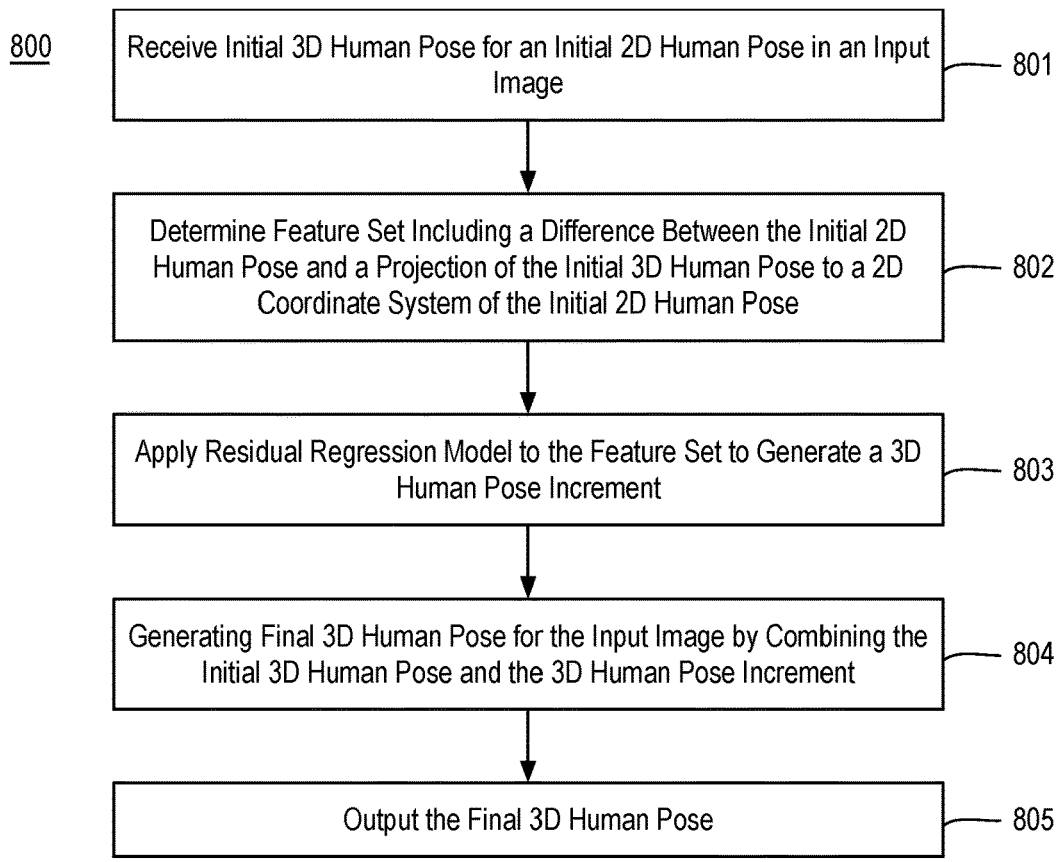
FIG. 8 is a flow diagram illustrating an example process for estimating a 3D human pose.

FIG. 8 is a flow diagram illustrating an example process 800 for estimating a 3D human pose, arranged in accordance with at least some implementations of the present disclosure. Process 800 may include one or more operations 801-805 as illustrated in FIG. 8. Process 800 may form at least part of a visual analytics application, artificial intelligence application, visual recognition application, or other application. By way of non-limiting example, process 800 may form at least part of a human pose or skeleton recognition process performed by system 100 in an implementation phase. Furthermore, process 800 will be described herein with reference to system 900 of FIG. 9.

Figure 9:
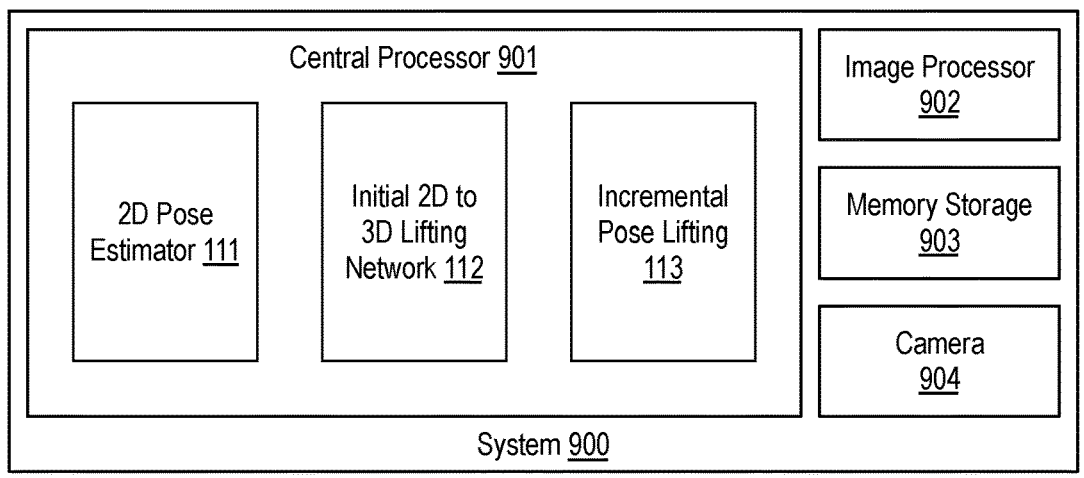
FIG. 9 is an illustrative diagram of an example system for estimating a 3D human pose.

FIG. 9 is an illustrative diagram of an example system 900 for estimating a 3D human pose, arranged in accordance with at least some implementations of the present disclosure. As shown in FIG. 9, system 900 may include a central processor 901, an image processor 902, a memory storage 903, and a camera 904. For example, camera 904 may acquire input images for processing. Also as shown, central processor 901 may include or implement 2D pose estimator 111, initial 2D to 3D lifting network 112, and incremental pose lifting module 113. System 900 may also include or implement any modules, layers, or components as discussed herein. Memory storage 903 may store 2D input images, initial or input 2D pose data, initial or input 3D pose data, final 3D pose data, iterative 3D pose data, projected 2D pose data, feature sets, regressor parameters, or any other data discussed herein.

As shown, in some examples, 2D pose estimator 111, initial 2D to 3D lifting network 112, and incremental pose lifting module 113 are implemented via central processor 901. In other examples, one or more or portions of 2D pose estimator 111, initial 2D to 3D lifting network 112, and incremental pose lifting module 113 are implemented via image processor 902, a video processor, a graphics processor, or the like. In yet other examples, one or more or portions of 2D pose estimator 111, initial 2D to 3D lifting network 112, and incremental pose lifting module 113 are implemented via an image or video processing pipeline or unit.

Image processor 902 may include any number and type of graphics, image, or video processing units that may provide the operations as discussed herein. In some examples, image processor 902 is an image signal processor. For example, image processor 902 may include circuitry dedicated to manipulate image data obtained from memory storage 903. Central processor 901 may include any number and type of processing units or modules that may provide control and other high level functions for system 900 and/or provide any operations as discussed herein. Memory storage 903 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory storage 903 may be implemented by cache memory.

In an embodiment, one or more or portions of 2D pose estimator 111, initial 2D to 3D lifting network 112, and incremental pose lifting module 113 are implemented via an execution unit (EU) of image processor 902. The EU may include, for example, programmable logic or circuitry such as a logic core or cores that may provide a wide array of programmable logic functions. In an embodiment, one or more or portions of 2D pose estimator 111, initial 2D to 3D lifting network 112, and incremental pose lifting module 113 are implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of 2D pose estimator 111, initial 2D to 3D lifting network 112, and incremental pose lifting module 113 are implemented via an application specific integrated circuit (ASIC). The ASIC may include an integrated circuitry customized to perform the operations discussed herein. Camera 904 may include any camera having any suitable lens and image sensor and/or related hardware for capturing images or video for input to a CNN as discussed herein.

Returning to discussion of FIG. 8, process 800 begins at operation 801, where an initial 3D human pose corresponding to an initial 2D human pose in an input image is received. Although discussed with respect to human pose processing for the sake of clarity if presentation, process 800 may be performed using any suitable object. In some embodiments, process 800 includes generating the initial 3D human pose by applying a lifting network to the initial 2D human pose. In some embodiments, the lifting network is a fully connected network (FCN). In some embodiments, the lifting network is a graph convolutional network (GCN). In some embodiments, the lifting network is a locally connected network (LCN).

Processing continues at operation 802, where a feature set is determined based on the initial 2D human pose and a projection of the initial 3D human pose to a 2D coordinate system corresponding to the initial 2D human pose. The feature set may include any suitable features. In some embodiments, the feature set includes a difference between the initial 2D human pose and a projection of the initial 3D human pose to a 2D coordinate system corresponding to the initial 2D human pose.

Processing continues at operation 803, where a residual regression model is applied to the feature set to generate a 3D human pose increment. The residual regression model may be any suitable machine learning model. In some embodiments, the residual regression model is a neural network including a first fully connected layer, followed by a residual block comprising one or more hidden layers followed by a residual adder, followed by a second fully connected layer. In some embodiments, the first fully connected layer is to expand a dimensionality of the feature set and the second fully connected layer is to generate the 3D human pose increment. In some embodiments, the first fully connected layer is followed by a batch normalization layer, a rectified linear unit layer and a dropout layer prior to the residual block.

Processing continues at operation 804, where a final 3D human pose corresponding to the input image is generated based at least in part on combining the initial 3D human pose and the 3D human pose increment. In some embodiments, the final 3D human pose is a sum of the initial 3D human pose and the 3D human pose increment (i.e., an element by element sum of the initial 3D human pose and the 3D human pose increment). In some embodiments, the final 3D human pose includes a sum of the initial 3D human pose, the 3D human pose increment, and other 3D human pose increments generated in an iterative manner.

In some embodiments, the final 3D human pose is or includes a combination of the initial 3D human pose, the 3D human pose increment, and one or more iterative 3D human pose increments each generated by iteratively determining a current iteration feature set comprising a current iteration difference between the initial 2D human pose and a current iteration projection of a prior iteration 3D human pose to the 2D coordinate system and applying a current iteration residual regression model to the current iteration feature set to generate a current iterative 3D human pose increment of the iterative 3D human pose increments. In some embodiments, the final 3D human pose is a sum of the initial 3D human pose, the 3D human pose increment, and each of the iterative 3D human pose increments. In some embodiments, the residual regression model and each of the current iteration residual regression models comprises different residual regression model parameters. In some embodiments, a number of iterations is predefined and comprises not more than five iterations. In some embodiments, the one or more iterative human pose increments comprise coarse to fine increments such that the 3D human pose increment is a temporally first human pose increment having a larger increment measure than a temporally final 3D human pose increment of the iterative 3D human pose increments.

Processing continues at operation 805, where the final 3D human pose it output for use, for example, by another module, component, or application. The final 3D human pose may be output for use in any suitable application such as a human action recognition application, a human robot/computer interaction application, an augmented reality application, an animation application, a gaming application, or others.

Various components of the systems described herein may be implemented in software, firmware, and/or hardware and/or any combination thereof. For example, various components of the systems discussed herein may be provided, at least in part, by hardware of a computing System-on-a-Chip (SoC) such as may be found in a computing system such as, for example, a smartphone. Those skilled in the art may recognize that systems described herein may include additional components that have not been depicted in the corresponding figures. For example, the systems discussed herein may include additional components such as communications modules and the like that have not been depicted in the interest of clarity. In some embodiments, a system includes a memory to store any data structure discussed herein and one or more processors to implement any operations discussed herein.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the systems discussed herein or any other module or component as discussed herein. In some embodiments, the operations discussed herein are implemented by at least one non-transitory machine readable medium including instructions that, in response to being executed on a device, cause the device to perform such operations.

As used in any implementation described herein, the term "module" or "component" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
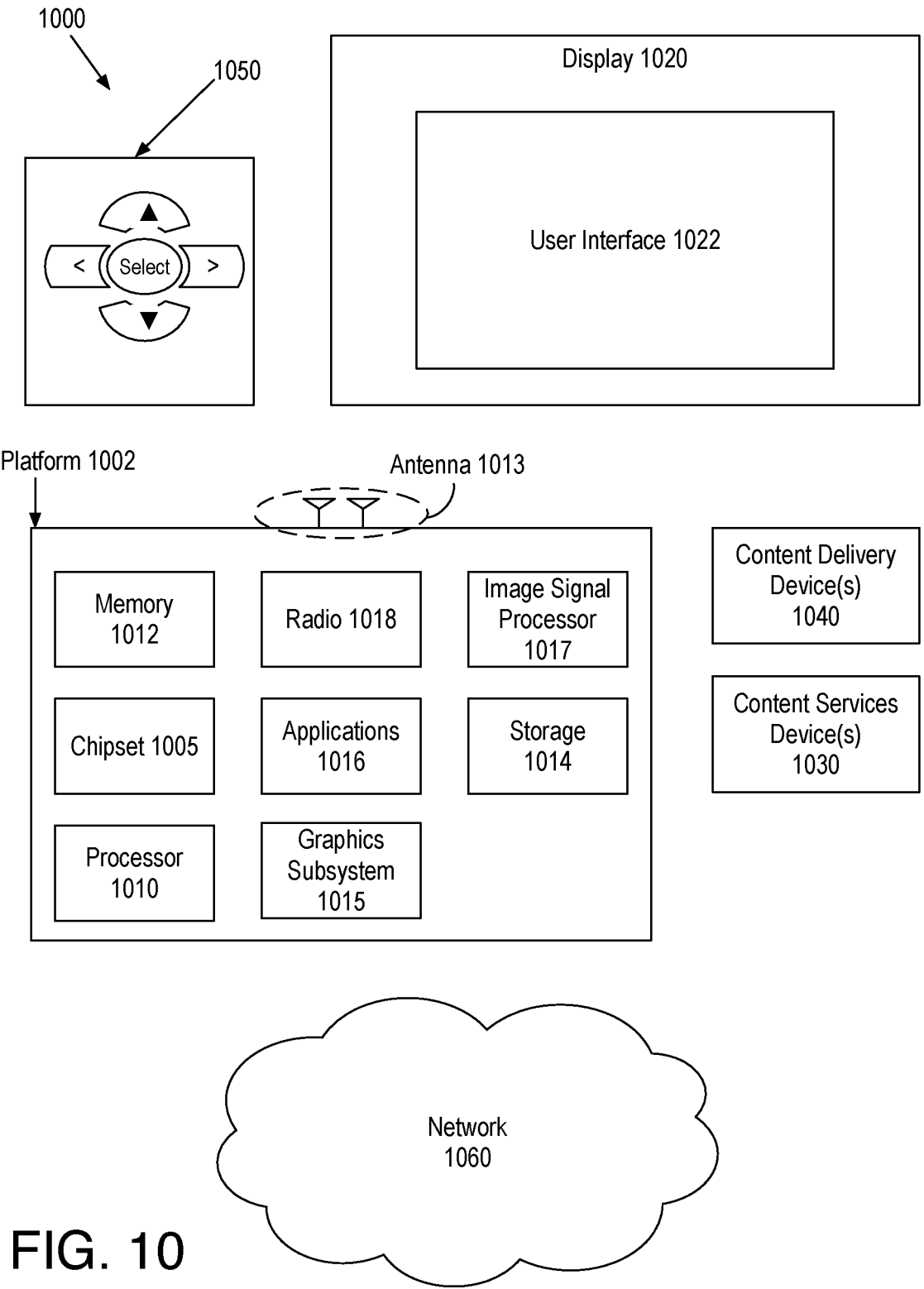
FIG. 10 is an illustrative diagram of an example system.

FIG. 10 is an illustrative diagram of an example system 1000, arranged in accordance with at least some implementations of the present disclosure. In various implementations, system 1000 may be a mobile system although system 1000 is not limited to this context. System 1000 may implement and/or perform any modules or techniques discussed herein. For example, system 1000 may be incorporated into a personal computer (PC), server, laptop computer, ultralaptop computer, tablet, touch pad, portable computer, handheld computer, palmtop computer, personal digital assistant (PDA), cellular telephone, combination cellular telephone/PDA, television, smart device (e.g., smartphone, smart tablet or smart television), mobile internet device (MID), messaging device, data communication device, cameras (e.g. point-and-shoot cameras, super-zoom cameras, digital single-lens reflex (DSLR) cameras), and so forth. In some examples, system 1000 may be implemented via a cloud computing environment.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset

1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Image signal processor 1017 may be implemented as a specialized digital signal processor or the like used for image or video frame processing. In some examples, image signal processor 1017 may be implemented based on a single instruction multiple data or multiple instruction multiple data architecture or the like. In some examples, image signal processor 1017 may be characterized as a media processor. As discussed herein, image signal processor 1017 may be implemented based on a system on a chip architecture and/or based on a multi-core architecture.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of navigation controller 1050 may be used to interact with user interface 1022, for example. In various embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In various embodiments, navigation controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
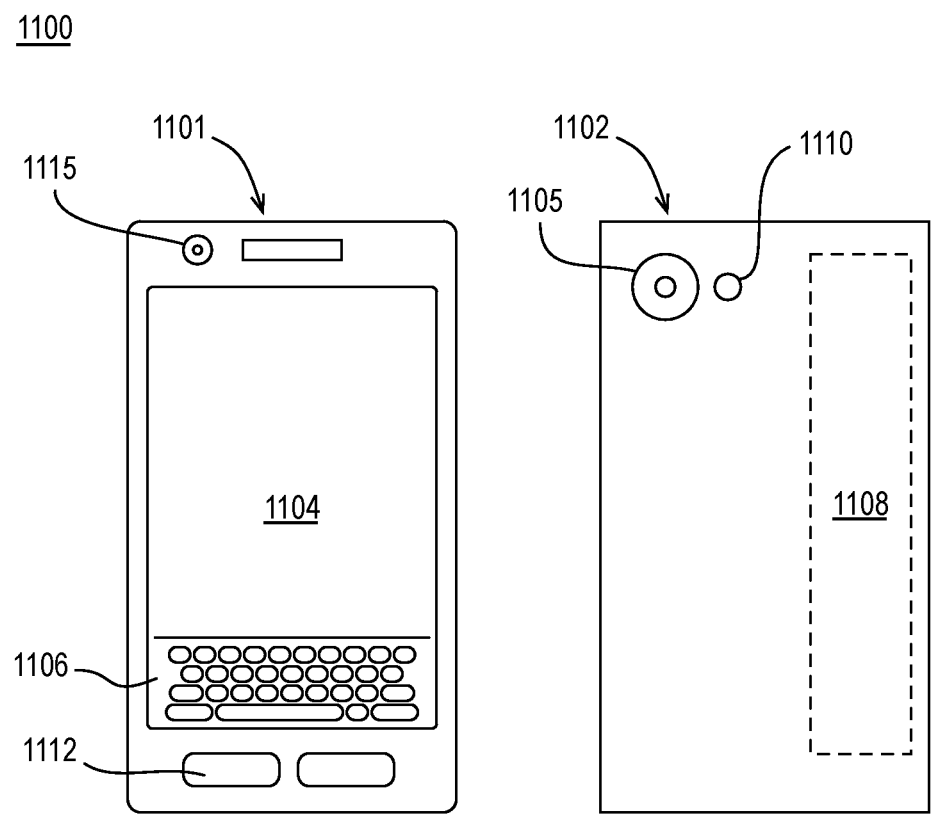
FIG. 11 illustrates an example small form factor device, all arranged in accordance with at least some implementations of the present disclosure.

As described above, system 1000 may be embodied in varying physical styles or form factors. FIG. 11 illustrates an example small form factor device 1100, arranged in accordance with at least some implementations of the present disclosure. In some examples, system 1000 may be implemented via device 1100. In other examples, other systems discussed herein or portions thereof may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computers, finger computers, ring computers, eye-glass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 11, device 1100 may include a housing with a front 1101 and a back 1102. Device 1100 includes a display 1104, an input/output (I/O) device 1106, camera 1115, a camera 1105, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include camera 1105 and a flash 1110 integrated into back 1102 (or elsewhere) of device 1100 and camera 1115 integrated into front 1101 of device 1100. In some embodiments, either or both of cameras 1115, 1105 may be moveable with respect to display 1104. Camera 1115 and/or camera 1105 may be components of an imaging module or pipeline to originate color image data processed into streaming video that is output to display 1104 and/or communicated remotely from device 1100 via antenna 1108 for example. For example, camera 1115 may capture input images and eye contact corrected images may be provided to display 1104 and/or communicated remotely from device 1100 via antenna 1108.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following embodiments pertain to further embodiments.

In one or more first embodiments, a method for estimating a 3D human pose comprises receiving an initial 3D human pose corresponding to an initial 2D human pose in an input image, determining a feature set comprising a difference between the initial 2D human pose and a projection of the initial 3D human pose to a 2D coordinate system corresponding to the initial 2D human pose, applying a residual regression model to the feature set to generate a 3D human pose increment, and generating a final 3D human pose corresponding to the input image based at least in part on combining the initial 3D human pose and the 3D human pose increment.

In one or more second embodiments, further to the first embodiment, the final 3D human pose comprises a combination of the initial 3D human pose, the 3D human pose increment, and one or more iterative 3D human pose increments each generated by iteratively determining a current iteration feature set comprising a current iteration difference between the initial 2D human pose and a current iteration projection of a prior iteration 3D human pose to the 2D coordinate system and applying a current iteration residual regression model to the current iteration feature set to generate a current iterative 3D human pose increment of the iterative 3D human pose increments.

In one or more third embodiments, further to the first or second embodiments, the final 3D human pose is a sum of the initial 3D human pose, the 3D human pose increment, and each of the iterative 3D human pose increments.

In one or more fourth embodiments, further to any of the first through third embodiments, the residual regression model and each of the current iteration residual regression models comprises different residual regression model parameters.

In one or more fifth embodiments, further to any of the first through fourth embodiments, a number of iterations is predefined and comprises not more than five iterations.

In one or more sixth embodiments, further to any of the first through fifth embodiments, the one or more iterative human pose increments comprise coarse to fine increments such that the 3D human pose increment is a temporally first human pose increment having a larger increment measure than a temporally final 3D human pose increment of the iterative 3D human pose increments.

In one or more seventh embodiments, further to any of the first through sixth embodiments, the residual regression model comprises a neural network comprising a first fully connected layer, followed by a residual block comprising one or more hidden layers followed by a residual adder, followed by a second fully connected layer.

In one or more eighth embodiments, further to any of the first through seventh embodiments, the first fully connected layer to expand a dimensionality of the feature set and the second fully connected layer to generate the 3D human pose increment.

In one or more ninth embodiments, further to any of the first through eighth embodiments, the first fully connected layer is followed by a batch normalization layer, a rectified linear unit layer and a dropout layer prior to the residual block.

In one or more tenth embodiments, further to any of the first through ninth embodiments, the method further comprises generating the initial 3D human pose by applying a lifting network to the initial 2D human pose.

In one or more eleventh embodiments, further to any of the first through tenth embodiments, the lifting network comprises one of a fully connected network (FCN), a graph convolutional network (GCN), or a locally connected network (LCN).

In one or more twelfth embodiments, a device or system includes a memory and one or more processors to perform a method according to any one of the above embodiments.

In one or more thirteenth embodiments, at least one machine readable medium includes a plurality of instructions that in response to being executed on a computing device, cause the computing device to perform a method according to any one of the above embodiments.

In one or more fourteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system comprising:
a memory to store at least a portion of an initial three-dimensional (3D) human pose corresponding to an initial two-dimensional (2D) human pose from an input image;
machine-readable instructions; and
at least one programmable circuit to be programmed based on the machine-readable instructions to:
input a feature vector to a residual regression model, the feature vector based on a difference between the initial 2D human pose and a projection of the initial 3D human pose to a 2D coordinate system corresponding to the initial 2D human pose, the residual regression model to generate a 3D human pose increment based on the feature vector; and
generate a final 3D human pose corresponding to the input image based at least in part on the initial 3D human pose and the 3D human pose increment.

2. The system of claim 1, wherein the final 3D human pose is based on a combination of the initial 3D human pose, the 3D human pose increment, and one or more subsequent 3D human pose increments generated to iteratively over a plurality of iterations, one or more of the at least one programmable circuit to generate a next one of the subsequent 3D human pose increments in a current one of the iterations by:
determining a current feature vector for the current one of the iterations based on a difference between the initial 2D human pose and a projection of an intermediate 3D human pose to the 2D coordinate system, the intermediate 3D human pose determined in a prior one of the iterations; and
inputting the current feature vector to a current residual regression model to generate the next one of the subsequent 3D human pose increments, the current residual regression model associated with the current one of the iterations.

3. The system of claim 2, wherein one or more of the at least one programmable circuit is to generate the final 3D human pose based on a sum of the initial 3D human pose, the 3D human pose increment, and the one or more subsequent 3D human pose increments.

4. The system of claim 2, wherein the residual regression model and the current residual regression model include different residual regression model parameters.

5. The system of claim 2, wherein a number of the iterations is predefined and is not more than five iterations.

6. The system of claim 2, wherein the one or more subsequent 3D human pose increments provide coarse to fine increments over the plurality of iterations such that the 3D human pose increment is a temporally initial human pose increment having a larger increment measure than a temporally final one of the subsequent 3D human pose increments.

7. The system of claim 1, wherein the residual regression model includes a neural network, and the neural network includes a first fully connected layer, followed by a residual block including one or more hidden layers followed by a residual adder, followed by a second fully connected layer.

8. The system of claim 7, wherein the first fully connected layer is to expand a dimensionality of the feature vector and the second fully connected layer is to generate the 3D human pose increment.

9. The system of claim 7, wherein the first fully connected layer is followed by a batch normalization layer, a rectified linear unit layer and a dropout layer prior to the residual block.

10. The system of claim 1, wherein one or more of the at least one programmable circuit is to:
generate the initial 3D human pose by applying a lifting network to the initial 2D human pose.

11. The system of claim 10, wherein the lifting network includes at least one of a fully connected network (FCN), a graph convolutional network (GCN), or a locally connected network (LCN).

12. A method comprising:
processing a feature vector with a residual regression model, the feature vector based on a difference between an initial two-dimensional (2D) human pose from an image and a projection of an initial three-dimensional (3D) human pose to a 2D coordinate system corresponding to the initial 2D human pose, the residual regression model to generate a 3D human pose increment based on the feature vector, the initial 3D human pose corresponding to the initial 2D human pose; and
generating, by at least one programmable circuit programmed based on at least one instruction, a final 3D human pose corresponding to the image based at least in part on the initial 3D human pose and the 3D human pose increment.

13. The method of claim 12, wherein the final 3D human pose is based on a combination of the initial 3D human pose, the 3D human pose increment, and one or more subsequent 3D human pose increments generated iteratively over a plurality of iterations, and including generating a next one of the subsequent 3D human pose increments in a current one of the iterations by:
determining a current feature vector for the current iteration one of the iterations based on a difference between the initial 2D human pose and a projection of an intermediate 3D human pose to the 2D coordinate system, the intermediate 3D human pose determined in a prior one of the iterations; and
processing the current feature vector with a current residual regression model to generate the next one of the subsequent 3D human pose increments, the current residual regression model associated with the current one of the iterations.

14. The method of claim 13, wherein the generating of the final 3D human pose is based on a sum of the initial 3D human pose, the 3D human pose increment, and the one or more subsequent 3D human pose increments.

15. The method of claim 12, wherein the residual regression model includes a neural network, and the neural network includes a first fully connected layer, followed by a residual block including one or more hidden layers followed by a residual adder, followed by a second fully connected layer.

16. The method of claim 12, including:
generating the initial 3D human pose by applying a lifting network to the initial 2D human pose.

17. At least one non-transitory machine readable medium comprising instructions to cause at least one programmable circuit to at least:
process a feature vector with a residual regression model, the feature vector based on a difference between an initial two-dimensional (2D) human pose from an image and a projection of an initial three-dimensional (3D) human pose to a 2D coordinate system corresponding to the initial 2D human pose, the residual regression model to generate a 3D human pose increment based on the feature vector, the initial 3D human pose corresponding to the initial 2D human pose; and generate a final 3D human pose corresponding to the image based at least in part on the initial 3D human pose and the 3D human pose increment.

18. The at least one non-transitory machine readable medium of claim 17, wherein the final 3D human pose is based on a combination of the initial 3D human pose, the 3D human pose increment, and one or more subsequent 3D human pose increments generated iteratively over a plurality of iterations, and the instructions are to cause one or more of the at least one programmable circuit to generate a next one of the subsequent 3D human pose increments in a current one of the iterations by:

determining a current feature a vector for the current one of the iterations based on a difference between the initial 2D human pose and a projection of an intermediate 3D human pose to the 2D coordinate system, the intermediate 3D human pose determined in a prior one of the iterations; and processing the current feature vector with a current residual regression model the next one of the subsequent 3D human pose increments, the current residual regression model associated with the current one of the iteration.

19. The at least one non-transitory machine readable medium of claim 18, wherein the instructions are to cause one or more of the at least one programmable circuit to generate the final 3D human pose based on a sum of the initial 3D human pose, the 3D human pose increment, and the one or more subsequent 3D human pose increments.

20. The at least one non-transitory machine readable medium of claim 17, wherein the residual regression model includes a neural network, and the neural network includes a first fully connected layer, followed by a residual block including one or more hidden layers followed by a residual adder, followed by a second fully connected layer.

21. The at least one non-transitory machine readable medium of claim 17, wherein the instructions are to cause one or more of the at least one programmable circuit to:

generate the initial 3D human pose by applying a lifting network to the initial 2D human pose.

* * * * *